MAGNETIC CORE CIRCUIT

Filed Feb. 25, 1957

INVENTOR.
Arthur W. Lo
BY Milton S. Winters
ATTORNEY.

United States Patent Office 3,056,115
Patented Sept. 25, 1962

3,056,115

MAGNETIC CORE CIRCUIT

Arthur W. Lo, Fords, N.J., assignor to Radio Corporation of America, a corporation of Delaware Filed Feb. 25, 1957, Ser. No. 642,294
30 Claims. (Cl. 340—174)

Figures 1, 1A, 2:
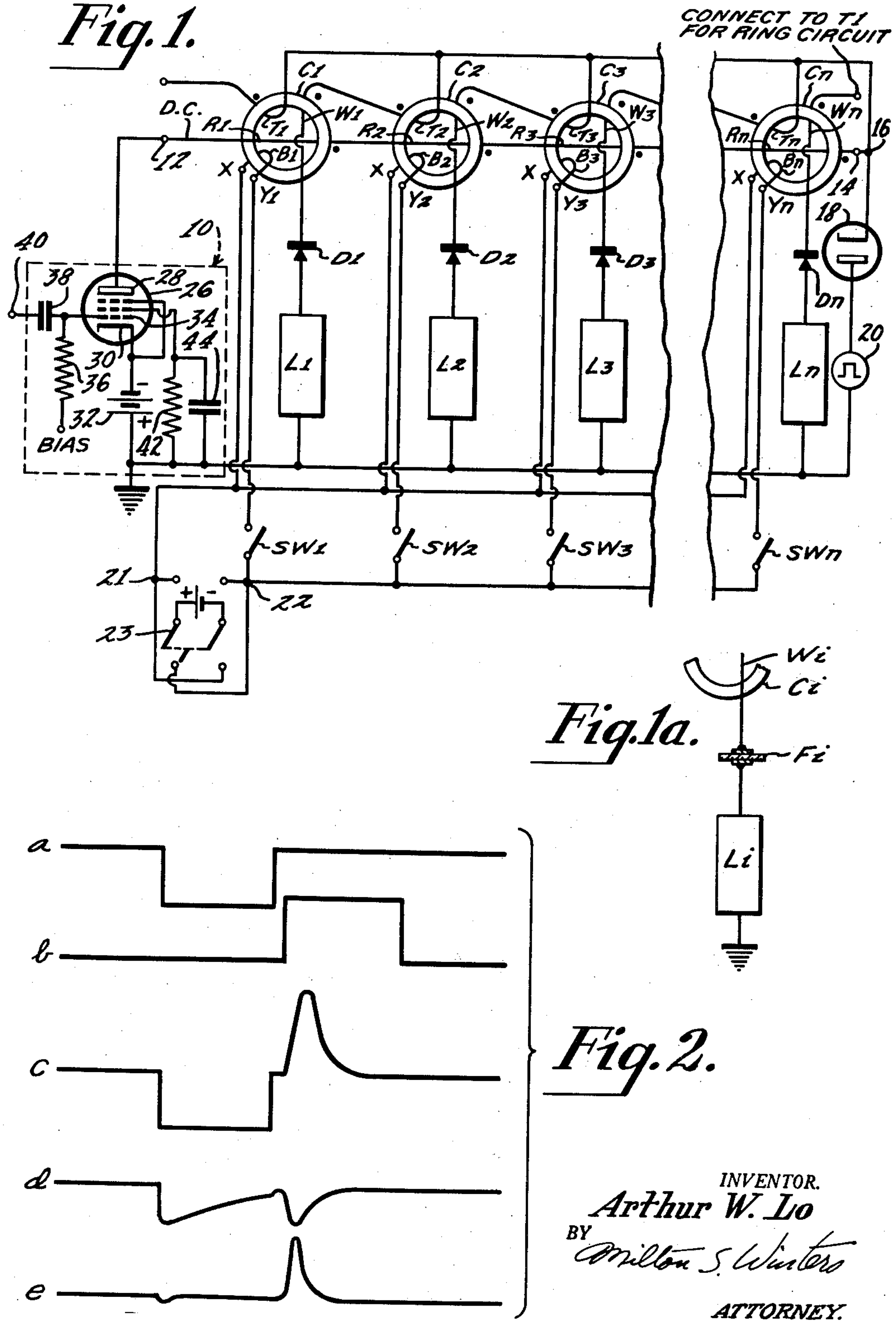

The present invention is related to magnetic core circuits, and particularly to circuits employing magnetic cores having substantially rectangular hysteresis loops.

The present invention provides a commutator, that is, a device for sending current successively from one path to another. The commutator may take the form of a counter, that path last receiving current providing an index of the count, or a ring counter, if desired. Speed of operation in such counters is highly desirable.

Among the objects of the present invention is to provide a commutating circuit having high speed of operation.

Another object of the invention is to provide a high speed ring counter.

A further object of the invention is to provide a commutating circuit having high speed of operation and automatic commutation from one circuit branch to another.

The foregoing and other objects, advantages, and novel features of the invention will be more fully apparent after a complete reading of the specification in connection with the accompanying drawing, in which:

FIG. 1 is a circuit diagram schematically showing one embodiment of the invention; and FIG. 2 is a timing diagram showing waveforms useful in explaining the operation of the embodiment of FIG. 1.

Current steering circuits are known which use magnetic cores having substantial remanence, that is, substantially rectangular hysteresis loops. These steering circuits provide multiple paths connected in shunt. A pulse source is connected across the shunt paths. The core in a selected path is placed in one state and the cores in the non-selected paths are placed in another state. Substantially all the current from the pulse source flows through the selected path and substantially none of the current flows through the other shunt paths. The present invention employs the principles of current steering in constructing a circuit in which the selected core steers the current through one shunt path. The invention also employs the storage effect, either of crystal diodes or of ferroelectric elements, to send a current in the opposite sense through the selected path and at the same time cause selection of an adjacent or subsequent core. Thus, the invention makes use of both the principles of current steering and of charge storage.

In accordance with the invention, a drive coil is coupled to a group of cores, each core having a high remanence. This coil is connected in series with a group of circuits connected in shunt with each other. Each shunt circuit includes, connected in series, a first winding coupled to a corresponding one of the cores, a winding coupled to a succeeding core, a charge storage element, and a load. The senses of coupling of the drive coil and the shunt coils are such that the drive coil current, when passing through the drive coil and a single shunt circuit, generates opposing M.M.F.'s in the core corresponding to the first winding of that single shunt circuit, and aiding M.M.F.'s in the succeeding core.

In operation, assume all the cores, except one, are in a state designated N, corresponding to that toward which current in the drive coil from a drive source tends to place them. Let the selected core (of the selected shunt circuit) be placed in the opposite, P state, as by current through a selecting coil. Now, when a drive source applies current through the drive coils, the net M.M.F.'s in the selected coil drives it to the N state. At the same time, the voltage induced in the shunt coil holds the other shunt circuits non-conductive. Therefore, all the current from the drive source passes through the selected shunt circuit. The selected core is driven toward the N state. Next, a second source connected across the shunt circuits is activated. Current is blocked by all the storage elements except that one having a charge available to supply current through the second source. Hence, two current pulses are driven first in one, and then in the opposite, direction through the selected shunt circuit.

The charge storage elements may be diodes, or they may be ferroelectric cells.

With reference to FIG. 1, there are indicated a plurality of ordered cores C1, C2, C3 . . . $C_n$ (where $n$ may be any integer greater than 1), each having a rectangular hysteresis loop. They are ordered because one succeeds another in their electrical connections as will be more fully apparent hereinafter. The numeral associated with the letter C indicates the first, second, third, etc., to $n$ cores, respectively. Each $i$th core C$i$ (where $i$ may be 1, 2, 3, etc., to $n$) has a reset winding R$i$, a selecting winding B$i$, a load winding W$i$, and a transfer winding T$i$. The reset windings R$i$ are connected in series, to form a drive coil DC. Between one terminal 12 of the drive coil DC and ground, or a common line indicated by the conventional ground symbol, is connected a drive source 10. The other terminal 14 of the drive coil DC is connected to a junction 16. Associated with each core C$i$ and each load winding W$i$ are a diode D$i$ and a load L$i$. The load L$i$, the diode D$i$, the load winding W$i$, and the transfer winding T$(i+1)$ of the succeeding core are connected in a series load circuit. The series load circuits are connected in shunt with each other between the junction 16 and ground. A non-storage diode 18 is connected in series with a current source 20 between the junction 16 and ground. Each selecting winding B$i$ has one terminal Y$i$ coupled to one terminal of a corresponding switch SW$i$. The other terminals of all the switches SW$i$ (SW1 to SW$n$) are connected together at a junction 22. The terminals X of all the selecting windings are connected together at a junction 21.

The junctions 21 and 22 are connected to a double pole, double throw switch 23 having its throw arms connected across a suitable battery. The connections to the switch 23 are made so that the junction 21 may be made positive with respect to the junction 22, or vice versa, or the junctions 21 and 22 may be disconnected from the battery or source 23.

The senses of the windings and connections are such that, as viewed in the drawing, a current tending to apply a magneto-motive force (abbreviated as M.M.F.) to any core in a counter clockwise direction is arbitrarily considered as tending to drive the core to a magnetic state N. A current tending to apply an M.M.F. in the opposite, clockwise direction, is considered as tending to drive the core to the opposite P state. Conventional current through the coil DC in the direction from the terminal 14 toward the terminal 12 tends to drive all of the cores to the N state. The source 20 provides a positive pulse at its ungrounded terminal which tends to apply current through any transfer winding T$i$ in a direction to drive any core toward its P state, and tends to drive current through any winding W$i$ in a direction to drive any core toward its N state. Note that the diodes are connected in a sense normally to oppose current flow from the source 20. The source 10 produces pulses of a polarity to make its ungrounded terminal 12 negative.

In operation, assume that the core C1 is in the P state of saturation and all the other cores are saturated in the N state. When a pulse from the source 10 is now applied, the current from this source 10 in the drive coil DC tends to turn the core C1 toward the N state. All of the current through the drive coil DC, or substantially all of this current, passes through the serial load circuit which includes the load L1, the diode D1, and the load winding W1 associated with the corresponding core C1. The current in load winding W1 causes an M.M.F. opposite to that due to the same current in drive coil DC. This current also passes through the transfer winding T2. Although the number of turns of the respective windings are not shown, the number of turns of the reset winding R*i* should exceed the number of turns of the load winding W*i* of the corresponding core. The turns ratio of these windings determines the speed of switching and the voltage generated in the load winding W*i*, which at this time acts as a secondary winding. Notice that the voltage induced in the load winding W*i* is of a polarity tending to make the diode D*i* conductive. As the core C1 turns over from the P state to the N state, the voltage generated in the load winding W1 is larger than the voltage drop across the load and diode in the same branch. Thus, the net voltage between junction 16 and ground is in such polarity as to bias all diodes, except D1, in the reverse direction. Accordingly, the other load circuits do not conduct, and substantially all the current passes through the load circuit of the core C1. If, however, as is the case when the state of the first core has substantially changed to N state, the diode 18 begins to conduct, substantially all of the current from the source 10 then passes through the diode 18. Bear in mind that the source 20 is assumed to have a low internal impedance to this flow of current. Thus, in the first instance, a heavy load current flows through the load L1 and in the forward direction through the diode D1. This heavy current stores carriers in the diode D1. The remainder of the current pulse from the source 10, if the core C1 has changed state, then flows through the diode 18.

At the end of the pulse from the source 10, and before the current carriers in the diode D1 have had an opportunity to dissipate, a voltage drive pulse is produced from the voltage source 20. The polarity of the pulse from the source 20 is such that it applies a reverse bias to all the load diodes D*i*. No appreciable current flow is possible in any of the diodes D1 to D*n* except in the diode D1. The diode D1 conducts in the reverse direction for a short time because of the stored carriers. The direction of flow of this current through the transfer winding T2 and the load winding W1 and the resultant mmf. tend to drive the core C2 from its N state to its P state and tend to drive the core C1 toward N. This current continues until the diode D1 has exhausted its stored current carriers, that is, has recovered. Note that in previous core-diode ring counter circuits, or commutator circuits, the current drive pulse must be sufficiently long to insure that the core in the P state has completely turned over to the N state. Accordingly, the pulse duration must be of at least a certain time. Furthermore, in these prior devices, the second drive pulse cannot be applied unitl the conducting diode has fully recovered from carrier storage, thus imposing a limit on the speed of operation. The arrangement of the present invention, however, does not impose such a limitation in time on the duration of the current drive pulse, here coming from the source 10. Moreover, the second, voltage drive pulse may be applied immediately, and it is, indeed, advantageous to do so in the present arrangement. Also, the voltage pulse from the voltage source 20 insures that the core C1 has been driven to the N state, when the circuit is properly designed. Accordingly, the speed of operation is increased over the prior art arrangements.

The core C2 is now in a P state, and all other cores in an N state. On the next activation of the current source 10 and the voltage source 20, the core C3 is placed in the P state and all other cores are in the N state, and so on.

In tests using pulses from the current source 10 of 0.2 microseconds duration, and pulses from voltage source 20 of like duration, and with substantially no interval of time between pulses, the core in the P state was changed from one core to the succeeding core and so forth, each change being accomplished in about 0.4 microsecond. A current substantially constant for the duration of the pulse and having an amplitude of about 1 ampere was steered to successive loads (each load having a resistive value of 5 ohms). Higher speed of operation was also shown to be possible. A further advantage of the present circuit is that the steered current has an amplitude, duration, and waveform determined by the drive current pulse.

The current source 10 may include a pentode tube 26 having its anode 28 connected to the terminal 12. The cathode 30 of the pentode 26 may be connected to the negative terminal of any suitable direct current (D.-C.) supply 32, the positive terminal of which is connected to ground. Bias may be supplied to a pentode control grid 34 through a suitable grid resistor 36. A blocking capacitor 38 may be connected between an input terminal 40 and the control grid 34. The suppressor grid of the pentode tube 26 is connected to the cathode 30, and the screen grid is connected through a suitable voltage dropping resistor 42, paralleled by a by-pass capacitor 44, to the positive terminal of the D.-C. supply 32.

When a positive pulse is applied to the control grid 34 through the blocking capacitor 38, the pentode 26 becomes conductive, and behaves, with the D.-C. supply 32, as though it were a source of substantially constant current. The constancy of the current is due, in this instance, to the high internal impedance of the pentode tube 26 in relation to the circuit external of the tube.

The voltage source 20 may be the voltage developed across a resistor in the cathode circuit of a triode, that is, a cathode follower circuit.

A useful variation of the circuit is illustrated in FIG. 1A, in which the diodes D*i* are replaced in their respective circuits by ferroelectric cells F*i*. When the diodes are used, the carrier storage is of limited time, and the current from the current source 20 is applied immediately after the termination of the drive current from the drive source 10 to take advantage of the charge storage. However, operation with the ferroelectric cell provides a more permanent form of storage. After the pulse from the drive source 10, where a selected core C*i* is in the P state, when the core is driven to the N state, the state of the associated ferroelectric cell changes from the state arbitrarily designated N to its other state, which may then be designated P. The pulse from the drive source 20 which next occurs then returns the cell F*i* completely to its N state. The other ferroelectric cells do not change state at this time because they are already in the N state. Observe that during the drive current pulse, only that ferroelectric cell F*i* associated with that core C*i* then in the P state is driven toward the P state, because the voltage generated in the then secondary coil, the load coil W*i*, is in the direction to drive the other ferroelectric cells toward the N state, and the current flow into the ferroelectric cell F*i* associated with the selected core C*i* is the only current which may then flow, until that element is charged in the N state, whereupon current flows through the diode 18.

When the embodiment employing ferroelectric cells is operated, the pulse from the current source 20 may be delayed for an indefinite time after the pulse from the drive source 10, because of the high remanence of the cells in their respective states. The two sources need not be synchronized. In the case of the diodes, suitable means (not shown) are provided to synchronize the two sources so that the source from the current pulse 20 follows the source from the drive source 10 by a suitably short interval.

The switches SW*i* permit a selected core to be chosen or selected at the start of an operating period. These switches permit a selected core to be placed in P or N state by operating the switches to provide an appropriate pulse of current. These switches could be replaced by tube or transistor circuits, if desired. Moreover, the last load winding W*n* may, if desired, be connected to the first transfer winding T1, thereby completing a ring circuit. Such a ring circuit may serve as a decade counter, for example if $i=10$. The tenth load circuit L10 may then be used for obtaining a carry signal.

Typical waveforms obtained from a circuit like that of FIG. 1 are shown in FIG. 2. At line *a* is the waveform of the drive current from the current source 10. At line *b* is a waveform showing the form of the voltage pulse from the voltage source 20. At line *c* is a waveform illustrating the current through the selected load L*i*. At line *d* is a waveform illustrating the voltage developed across the drive winding R1 of the selected core. At line *e* is a waveform illustrating the voltage across the transfer winding T $(i+1)$ of the core C $(i+1)$ succeeding the selected core. Although the waveforms are shown on a like time scale, they are not accurately to voltage and current scales. Moreover these waveforms are somewhat idealized.

In view of the foregoing description, it will be apparent that the invention provides a novel commutating circuit, that is, a circuit which sends current first through one load, and then through another. This novel circuit may be operated at a very high rate of speed, and may be modified to give substantial memory effects.

What is claimed is:

1. A circuit comprising a drive coil, a plurality of ordered magnetic cores each having a coupling with said drive coil and each having substantial remanence, and a plurality of circuits connected in shunt with each other and in series with said drive coil, each of said shunt-connected circuits including, in series, a coupling to a corresponding one of said cores, a coupling to the next succeeding core, and a charge storage element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit.

2. A circuit comprising a drive coil, a plurality of ordered magnetic cores each having a coupling with said drive coil and each having a substantially rectangular hysteresis characteristic, and a plurality of circuits connected in shunt with each other and in series with said drive coil, each of said shunt-connected circuits including, in series, a coupling to a corresponding one of said cores, a coupling to the next succeeding core, and a charge storage element, the senses of said couplings being such that a current passing through said drive coil and any single one of said shunt-connected circuits generates opposing M.M.F.'s in the corresponding core coupled to said single shunt-connected circuits and aiding M.M.F.'s in the succeeding core coupled to said single shunt-connected circuit, the M.M.F. generated by said current through said drive coil in said corresponding core exceeding that generated by said current through said shunt-connected circuit in said corresponding core.

3. A circuit comprising a drive coil, a plurality of ordered magnetic cores each having a coupling with said drive coil and each having a substantially rectangular hysteresis characteristic, and a plurality of circuits connected in shunt with each other and in series with said drive coil, each of said shunt-connected circuits including, in series, a coupling to a corresponding one of said cores, a coupling to the next suceceding core, and a crystal diode element, the senses of said couplings being such that a current pasisng through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit, the M.M.F. generated by said current through said drive coil in said corresponding core exceeding that generated by said current through said shunt-connected circuit in said corresponding core.

4. A circuit comprising a drive coil, a plurality of ordered magnetic cores each having a coupling with said drive coil and each having a substantially rectangular hysteresis characteristic, and a plurality of circuits connected in shunt with each other and in series with said drive coil, each of said shunt-connected circuits including, in series, a coupling of a first number of turns to a corresponding one of said cores, a coupling of a second number of turns to the next succeeding core, said first number being greater than said second number, a charge storage element, and a load circuit, the senses of said couplings being such that a current passing through said drive coil and any single one of said shunt-connected circuits generates opposing M.M.F.'s in the corresponding core coupled to said single shunt-connected circuit and aiding M.M.F.'s in the suceeding core coupled to said single shunt-connected circuit.

5. A circuit comprising a drive coil, a plurality of ordered magnetic cores each having a coupling with said drive coil and each having a substantially rectangular hysteresis characteristic, and a plurality of circuits connected in shunt with each other and in series with said drive coil, each of said shunt-connected circuits including, in series, a coupling of a first number of turns to a corresponding one of said cores, a coupling of a second number of turns to the next succeeding core, said first number being greater than said second number, a crystal diode element, and a load circuit, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit.

6. A circuit comprising a drive coil, a plurality of ordered magnetic cores each having a coupling with said drive coil and each having a substantially rectangular hysteresis characteristic, a plurality of circuits connected in shunt with each other and in a series circuit with said drive coil, each of said shunt-connected circuits including, in seres, a coupling of a first number of turns to a corresponding one of said cores, a coupling of a second number of turns to the next succeeding core, said first number being greater than said second number, and a charge storage element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit, and means to apply the output of a pulse source to said series circuit.

7. A circuit comprising a drive coil, a plurality of ordered magnetic cores each having a coupling with said drive coil and each having a substantially rectangular hysteresis characteristic, a plurality of circuits connected in shunt with each other and in a series circuit with said drive coil, each of said shunt-connected circuits including, in series, a coupling of a first number of turns to a corresponding one of said cores, a coupling of a second number of turns to the next succeeding core, said first number being greater than said second number and a charge storage element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit, and means to apply the output of a normally open-circuited pulse source to said series circuit.

8. A circuit comprising a drive coil, a plurality of ordered magnetic cores each having a coupling with said drive coil and each having a substantially rectangular hysteresis characteristic, a plurality of circuits connected in shunt with each other and in a series circuit with said drive coil, each of said shunt-connected circuits including, in series, a coupling of a first number of turns to a corresponding one of said cores, a coupling of a second number of turns to the next succeeding core, said first number being greater than said second number, and a charge storage element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit, means to apply the output of a normally open-circuited pulse source to said series circuit, and means to apply the output of a second pulse source to said shunt-connected circuits.

9. A circuit comprising a drive coil, a plurality of ordered magnetic cores each having a coupling with said drive coil and each having a substantially rectangular hysteresis characteristic, a plurality of circuits connected in shunt with each other and in a series circuit with said drive coil, each of said shunt-connected circuits including, in series, a coupling of a first number of turns to a corresponding one of said cores, a coupling of a second number of turns to the next succeeding core, said first number being greater than said second number, and a ferroelectric element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit, means to apply the output of a normally open-circuited pulse source to said series circuit, and means to apply the output of a second pulse source to said shunt-connected circuits.

10. A circuit comprising a drive coil, a plurality of ordered magnetic cores each having a coupling with said drive coil and each having a susbtantially rectangular hysteresis characteristic, a plurality of circuits connected in shunt with each other and in a series circuit with said drive coil, each of said shunt-connected circuits including, in series, a coupling of a first number of turns to a corresponding one of said cores, a coupling of a second number of turns to the next succeeding core, said first number being greater than said second number, and a crystal diode element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit, means to apply the output of a normally open-circuited pulse source to said series circuit, and means to apply the output of a second pulse source to said shunt-connected circuits.

11. A circuit comprising a drive coil, a plurality of ordered magnetic cores each coupled to said drive coil and each having a substantially rectangular hysteresis characteristic, a plurality of circuits connected in shunt with each other and in a series circuit with said drive coil, each of said shunt circuits including, in series, a coupling of a first number of turns to a corresponding one of said cores, a coupling of a second number of turns to the next succeeding core, said first number being greater than said second number, and a charge storage element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit, a normally open-circuited current pulse source connected to said series circuit, and a voltage pulse source connected across said shunt-connected circuits.

12. A circuit comprising a drive coil, a plurality of ordered magnetic cores each having a coupling with said drive coil and each having a substantially rectangular hysteresis characteristic, a plurality of circuits connected in shunt with each other and in a series circuit with said drive coil, each of said shunt-connected circuits including, in series, a coupling of a first number of turns to a corresponding one of said cores, a coupling of a second number of turns to the next succeeding core, said first number being greater than said second number, and a crystal diode element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit, a normally open-circuited current pulse source connected to said series circuit, and a voltage pulse source connected across said shunt-connected circuits.

13. A circuit comprising a drive coil, a plurality of ordered magnetic cores each having a coupling with said drive coil and each having a substantially rectangular hysteresis characteristic, a plurality of circuits connected in shunt with each other and in a series circuit with said drive coil, each of said shunt connected circuits including, in series, a coupling of a first number of turns to a corresponding one of said cores, a coupling of a second number of turns to the next succeeding core, said first number being greater than said second number, and a ferroelectric element, the senses of said couplings being such that a current passing through said drive coil and any single one of said shunt-connected circuits generates opposing mmf.'s in the corresponding core coupled to said single shunt-connected circuit and aiding mmf.'s in the succeeding core coupled to said single shunt-connected circuit, a normally open-circuited current pulse source connected to said series circuit, and a voltage pulse source connected across said shunt-connected circuits.

14. A circuit comprising a drive coil, a plurality of ordered magnetic cores each having a coupling with said drive coil and each having a substantially rectangular hysteresis characteristic, a plurality of circuits connected in shunt with each other and in a series circuit with said drive coil, each of said shunt-connected circuits including, in series, a coupling of a first number of turns to a corresponding one of said cores, a coupling of a second number of turns to the next succeeding core, said first number being greater than said second number, and a charge storage element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit, a normally open-circuited current pulse source the pulses of which have a polarity tending to drive current in one sense through said drive coil and shunt-connected circuits, and a voltage pulse source connected across said shunt-connected circuits, the pulses of said last-named source having a polarity tending to drive current in the opposite direction through said shunt-connected circuits.

15. A circuit comprising a drive coil, a plurality of ordered magnetic cores each having a coupling with said drive coil and each having a substantially rectangular hysteresis characteristic, a plurality of circuits connected in shunt with each other and in a series circuit with said drive coil, each of said shunt-connected circuits including, in series, a coupling of a first number of turns to a corresponding one of said cores, a coupling of a second number of turns to the next succeeding core, said first number being greater than said second number, and a charge storage element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit, means to connect a current source to said series circuit, and means to connect a circuit comprising a diode and a voltage pulse source in series across said shunt-connected circuits.

16. A circuit comprising a drive coil, a plurality of ordered magnetic cores each having a coupling with said drive coil and each having a substantially rectangular hysteresis characteristic, a plurality of circuits connected in shunt with each other and in a series circuit with said drive coil, each of said shunt-connected circuits including, in series, a coupling of a first number of turns to a corresponding one of said cores, a coupling of a second number of turns to the next succeeding core, said first number being greater than said second number, and a charge storage element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit, and a unidirectional current flow element connected across said shunt-connected circuits.

17. A circuit as claimed in claim 16, said charge storage element being a ferroelectric element.

18. A circuit as claimed in claim 16, said charge storage element being a crystal diode.

19. A circuit comprising a drive coil, a plurality of ordered magnetic cores each having a coupling with said drive coil and each having a substantially rectangular hysteresis characteristic, and a plurality of circuits connected in shunt with each other and in a series circuit with said drive coil, each of said shunt-connected circuits including, in series, a coupling of a first number of turns to a corresponding one of said cores, a coupling of a second number of turns to the next succeeding core, said first number being greater than said second number, and a charge storage element, the senses of said couplings being such that a current passing through said drive coil and any single one of the shunt-connected circuits generates opposing M.M.F.'s in the corresponding cores coupled to said single shunt-connected circuit and aiding M.M.F.'s in the succeeding core coupled to said single shunt-connected circuit, that one of said shunt-connected circuits being coupled by its said coupling of said first number of turns to the last of said cores in order being also coupled by its said coupling of said second number of turns to the first of said cores in order, thereby completing a ring circuit.

20. A circuit comprising a drive coil, a plurality of ordered magnetic cores each having a coupling with said drive coil and each having a substantially rectangular hysteresis characteristic, and a plurality of circuits connected in shunt with each other and in a series circuit with said drive coil, each of said shunt-connected circuits including, in series a coupling of a first number of turns to a corresponding one of said cores, a coupling of a second number of turns to the next succeeding core, said first number being greater than said second number, and a crystal diode element, the senses of said couplings being such that a current passing through said drive coil and any single one of said shunt-connected circuits generates opposing M.M.F.'s in the corresponding core coupled to said single shunt-connected circuit and aiding M.M.F.'s in the succeding core coupled to said single shunt-connected circuit, that one of said shunt-connected circuits being coupled by its said coupling of said first number of turns to the last of said cores in order being also coupled by its said coupling of said second number of turns to the first of said cores in order, thereby completing a ring circuit.

21. A ring circuit comprising a drive coil, a plurality of ordered magnetic cores each having a rectangular hysteresis characteristic, and a plurality of circuits corresponding respectively to said cores and connected in shunt with each other and in series with said drive coil, each of said shunt-connected circuits including, in series, a coupling to its said corresponding core, a coupling to a succeeding core, and a charge storage element, the one of said shunt-connected circuits corresponding to the last of said cores having as its succeeding core the first of said cores, thereby completing a ring circuit.

22. A circuit comprising a drive coil, a plurality of ordered magnetic cores each having a coupling with said drive coil and each having a substantially rectangular hysteresis characteristic, and a plurality of circuits connected in shunt with each other and in series with said drive coil, each of said shunt-connected circuits including, in series, a coupling of a first number of turns to a corresponding one of said cores, a coupling of a second number of turns to the next succeeding core, said first number being greater than said second number, and a charge storage element, the senses of said couplings being such that a current passing through said drive coil and any single one of said shunt-connected circuits generates opposing M.M.F.'s in the corresponding core coupled to said single shunt-connected circuit and aiding M.M.F.'s in the succeeding core coupled to said single shunt-connected circuit.

23. In combination, a pulse responsive storage element which is capable of assuming two states, said element being in a first state; means for applying a pulse to said element sufficiently short only partially to change its storage state; storage means coupled to said element and responsive to said pulse for accumulating a charge; a normally open discharge circuit for said storage means including a circuit coupled to said storage element for driving said element from its first state toward its second state upon discharge of said storage means through said discharge circuit; and means for closing said discharge circuit coincidentally with the end of said pulse.

24. In combination, a magnetic memory core which is capable of assuming two states, said core being in the first of said states; means for applying a current pulse to said core sufficiently short only partially to change its storage state; storage means coupled to said core and responsive to said pulse for accumulating a charge, said storage means being one of the type which stores a charge for a relatively short interval of time and then rapidly dissipates it; a normally open discharge circuit for said storage means including a winding coupled to said core for driving said core from its first state toward its second state upon discharge of said storage means through said discharge circuit; and means for closing said discharge circuit prior to the time said storage means has dissipated its charge.

25. In combination, a magnetic memory core which is capable of assuming two states, said core being in a first state; a winding passing through said core; means for applying a pulse to said winding sufficiently short and of the proper polarity partially to change the storage state of said core; a diode storage element responsive to said pulse for accumulating a charge; a normally open discharge circuit for said storage element including a winding on said core for driving said core from its first state toward its second state upon discharge of said diode storage element through said discharge circuit; and means for closing said discharge circuit prior to the time said diode storage element has dissipated its charge.

26. In combination, a plurality of magnetic memory cores, each capable of assuming one of two stable states; a drive winding passing through all cores; a return circuit for said winding including a second winding on one core, a third winding on another core, and a storage means; a discharge circuit for said storage means including said second and third winding; and a normally open switch in said discharge circuit which, when closed, permits said storage means to discharge through said second and third windings.

27. In the combination as set forth in claim 26, said second winding, third winding and storage means comprising a series circuit, and further including a plurality of other like series circuits connected in shunt with said series circuit, each core including one second winding, one third winding and one storage means.

28. In combination, an active element which stores charge carriers when driven into conduction; means for applying a voltage to the element which voltage is initially in the forward direction, whereby the element conducts and stores charge carriers, and is then in the reverse direction, whereby the element tends to discharge said charge carriers; and a discharge circuit connected to the element, said circuit including an asymmetrically conducting element connected to said active element in a sense to conduct in the easy direction in response to the discharge of charge carriers from said charge element, said combination further including a magnetic core, and a pair of series connected windings on said core, said forward voltage being applied to said active element through said series connected windings and said discharge circuit including one but not both of said series connected windings.

29. In combination, a semiconductor first diode which stores charge carriers when driven into conduction; a magnetic core; a pair of oppositely wound, series connected windings on said core connected to said diode; means for applying a forward voltage to said diode through said windings, whereby the diode stores charge carriers; a discharge circuit for said diode comprising one but not both of said windings and a second diode poled to conduct the discharge current of said first diode, said second diode being connected in series with said first diode and said one winding; and means for applying a reverse voltage to said first diode through said second diode during the time the first diode is storing charge carriers.

30. In combination, a semiconductor first diode which stores charge carriers when driven into conduction; a magnetic core; first and second oppositely wound, series connected windings on said core connected to said diode, said first winding having a greater number of turns than said second winding; means for applying a forward voltage to said diode through said windings, whereby the diode stores charge carriers; a discharge circuit for said diode comprising said second but not the first of said windings, and a second diode poled to conduct the discharge current of said first diode, said second diode being connected in series with said first diode and said second winding; and means for applying a reverse voltage to said first diode through said second diode during the time the first diode is storing charge carriers.

References Cited in the file of this patent

UNITED STATES PATENTS

| | | |
|---|---|---|
| 2,695,398 | Anderson | Nov. 23, 1954 |
| 2,710,952 | Steagall | June 14, 1955 |
| 2,719,773 | Karnaugh | Oct. 4, 1955 |
| 2,719,961 | Karnaugh | Oct. 4, 1955 |
| 2,719,962 | Karnaugh | Oct. 4, 1955 |
| 2,785,390 | Rajchman | Mar. 12, 1957 |
| 2,813,260 | Kaplan | Nov. 12, 1957 |
| 2,825,820 | Sims | Mar. 4, 1958 |
| 2,866,178 | Lo et al. | Dec. 23, 1958 |
| 2,904,626 | Rajchman | Sept. 15, 1959 |

OTHER REFERENCES

Publication, National Bureau of Standards Technical News Bulletin, vol. 38, No. 10, October 1954.